May 13, 1958 R. PETERS 2,834,494
HAND TRUCK
Filed Aug. 13, 1954 3 Sheets-Sheet 2
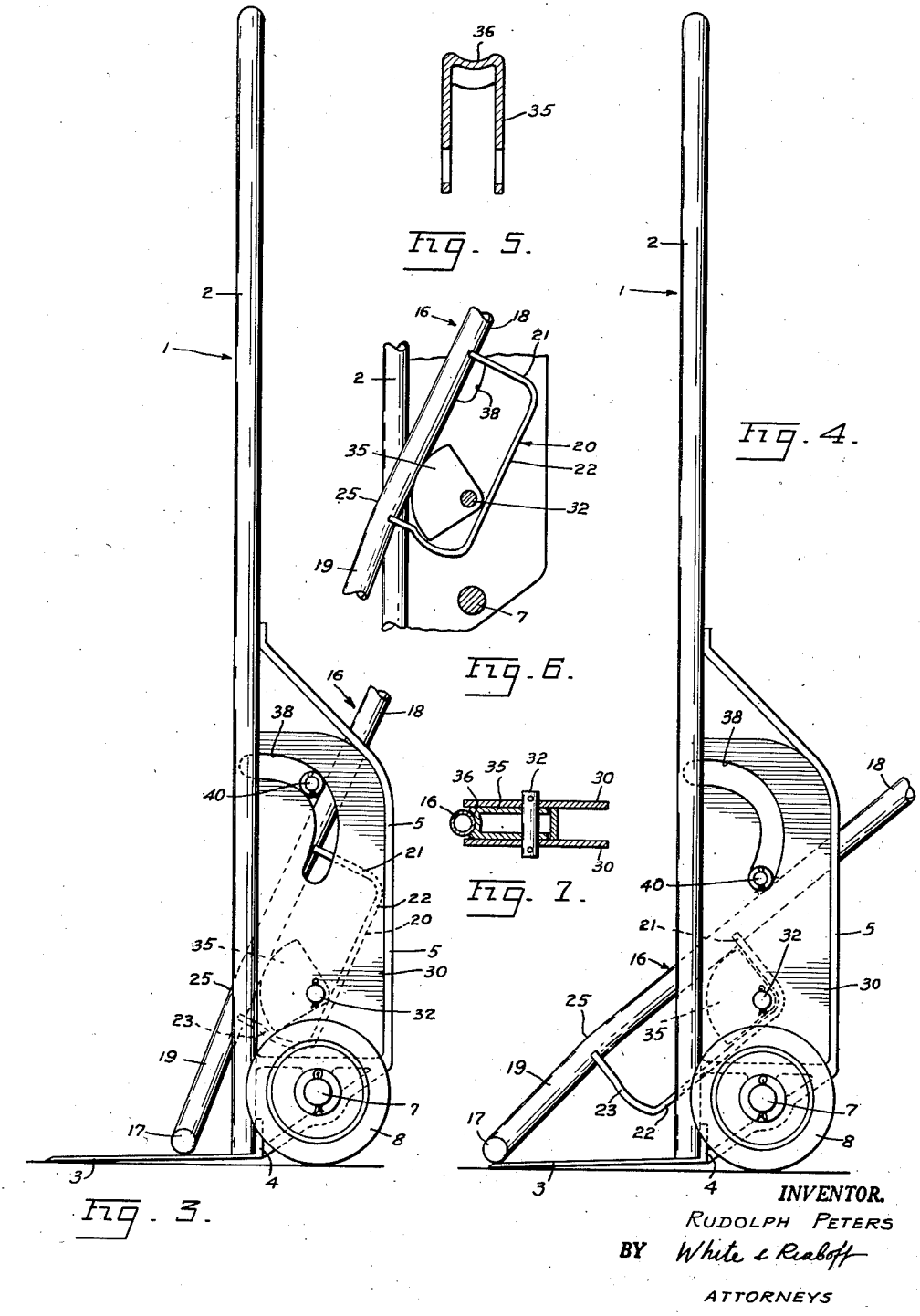
INVENTOR.
RUDOLPH PETERS
BY White & Reaboff
ATTORNEYS

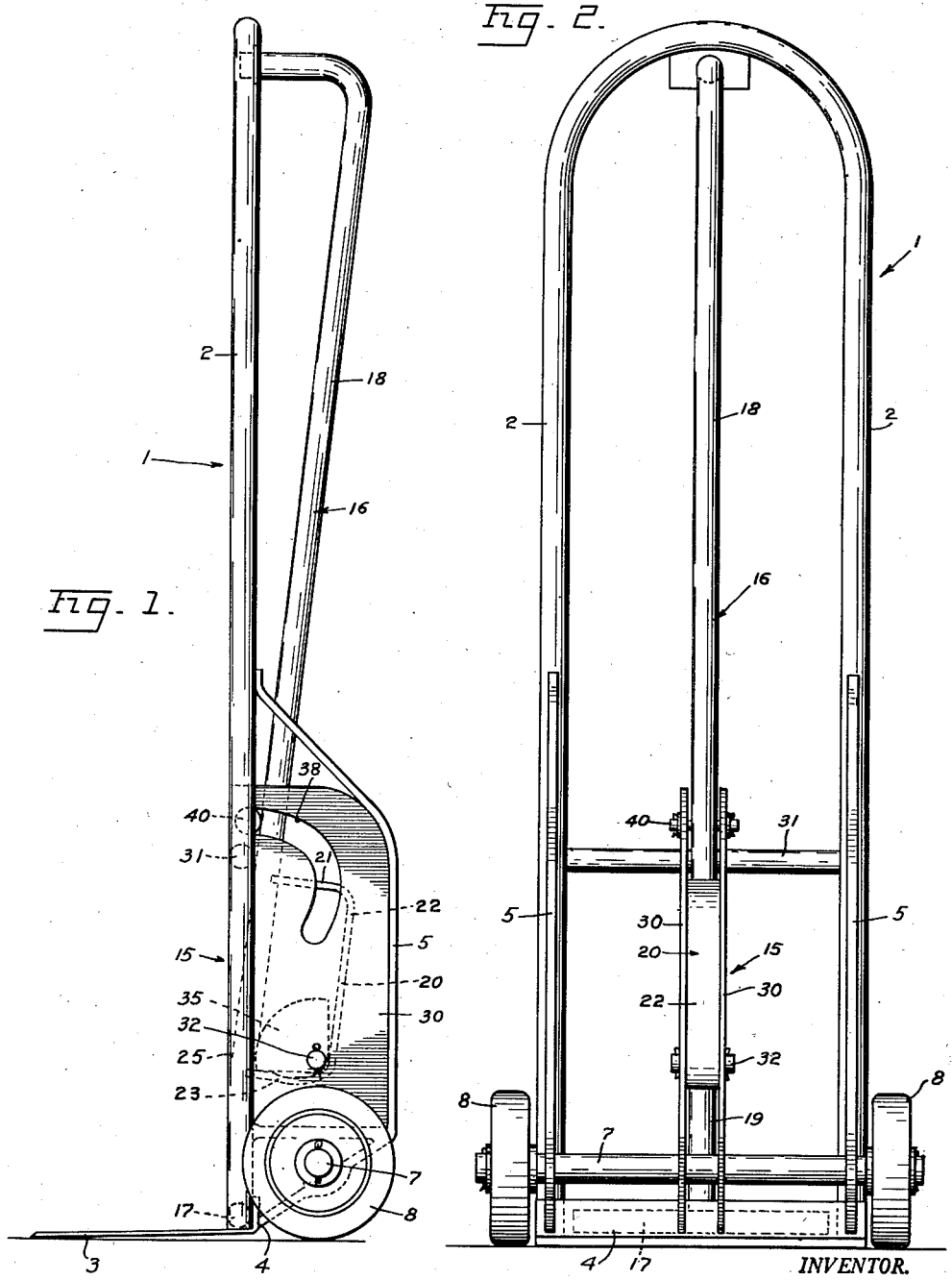

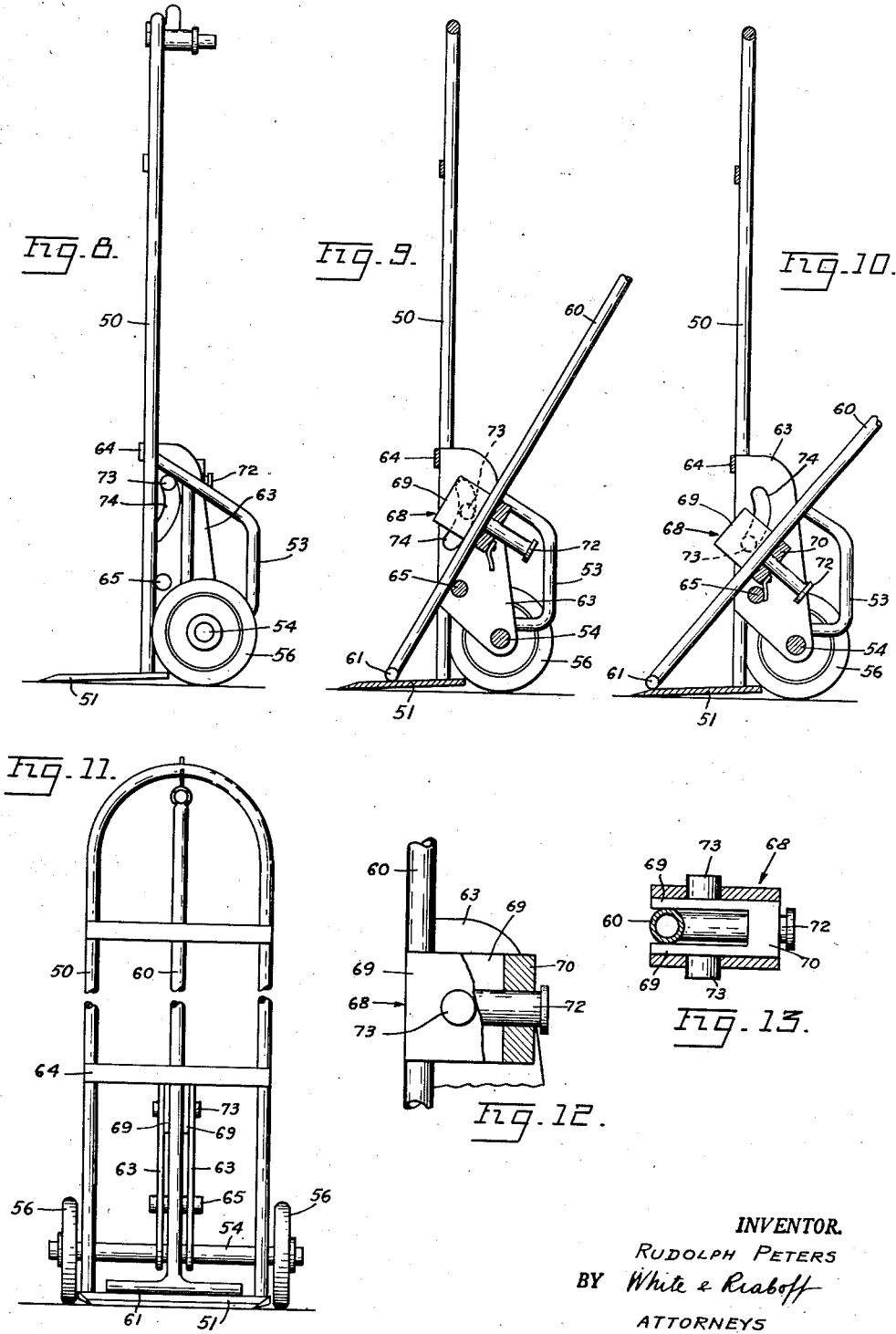

United States Patent Office 2,834,494
Patented May 13, 1958

2,834,494

HAND TRUCK

Rudolph Peters, Oakland, Calif., assignor, by direct and mesne assignments, of one-half to Frank Domonic Nicoli and one-half to Charles Thomas, both of El Cerrito, Calif.

Application August 13, 1954, Serial No. 449,672

5 Claims. (Cl. 214—511)

This invention relates to an improvement in a hand truck used in trucking crates, boxes, cartons and the like.

The primary object of this invention is to provide a hand truck with a hand operated mechanism for discharging the load from said truck.

Another object of the invention is to provide a truck of the type described which permits to place a stack of boxes, crates, cartons or the like very close to another stack, thus saving the warehouse space.

Another object of the invention is to provide a truck of the type described in which the unloading mechanism is simple, durable and efficient for the purpose intended.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a side view of a hand truck.

Fig. 2 is a rear view of the hand truck.

Fig. 3 and Fig. 4 is a side view of said truck showing different positions of the unloading device.

Fig. 5 is a cross-section through the quadrant.

Fig. 6 is a detailed side view of the quadrant mechanism.

Fig. 7 is a cross-section along the line 7—7 of Fig. 6.

Fig. 8 is a side view of a modified hand truck.

Figs. 9 and 10 are a vertical cross-section of the modified hand truck showing the parts thereof in different operational positions.

Fig. 11 is a front view of the hand truck.

Fig. 12 is a side view of the operating mechanism, and Fig. 13 is a plan view of Fig. 12.

In detail my hand truck, generally indicated at 1, consists of a rigid frame member 2 in form of an inverted U-shaped tube to the free lower ends of which is secured a load supporting platform 3. The latter is provided with a flange 4 which is welded or otherwise secured to said free ends of the frame 2 at the rear side thereof. The platform 3 is slightly inclined outwardly when the truck 1 rests on the ground in vertical position, to facilitate the loading and unloading of the truck.

The frame member 2 carries two axle brackets 5, which are attached to the rear side of said member. An axle 7 is secured in the brackets 5. The ends of said axle project beyond said brackets, and each of them carries a freely rotating truck wheel 8. The above described parts are more or less standard in hand trucks now in general use.

The hand truck 1 is equipped with an unloading mechanism generally indicated at 15, which mechanism includes a lever 16 extending from the top of the frame member 2 to the platform 3, and preferably made out of steel tubing. The lever 16 has a pusher 17 attached to the lower end of said lever which pushes boxes, cartons, sacks, or the like, stacked on the platform 3 off the same, when the lever 16 is operated by swinging the same in a clockwise direction.

The lever 16 consists of an upper part 18 arranged at a slight angle to said frame member 2, and a lower part 19 parallel to said frame member 2, when said lever 16 is in operative position as shown in Fig. 1.

Said lever 16 carries a guard 20 rigidly secured thereto and preferably made out of a strip of heavy steel. The guard 20 consists of a top 21 extending from said lever at the right angle thereto, a side 22 parallel to said lever 16, and a bottom 23 slightly curved outwardly, but which is substantially at the right angle to said lever. The bottom 23 is secured to said lever 16 slightly below the bend 25 which separates the upper part 18 from the lower part 19 of said lever 16. The guard 20 is slightly wider than the lever 16 as clearly shown in Fig. 2, and both are arranged to slide between two guide plates 30. The latter are rigidly attached to a cross piece 31 secured to the frame member 2, and to the platform flange 4. The guides 30 may be connected by several cross-pieces at its outer fringe for the purpose of reinforcing the same and for further rigidity.

A quadrant 35 is rotatably secured to a shaft 32 carried by the guides 30 and is confined between the latter with freedom of swinging on said shaft. The quadrant 35 has a groove 36 on its outer periphery, as shown in Fig. 5, and is of such size that the lever 16 normally rests in said groove 36. The upper portion of each of said guides 30 is provided with a curved slot 38. Both of said slots are aligned and adapted to guide a stub shaft 40 welded to said lever 16. The combination of the above described elements, to wit: the guard 20, the quadrant 35, the slots 38 and the stub shaft 40, control the movement of the lever 16 in such a way as to provide greater leverage at the beginning of the pushing the cargo off the platform which leverage gradually diminishes, while the speed of pushing the cargo proportionately increases with the speed of the movement of the lever 16 being constant. The quadrant 35 constantly changes the leverage, and the slots 38 with the stub shaft 40 control the advance and the angle of the lever 16.

Fig. 1 shows the hand truck 1 ready to begin the discharge of the load, not shown in the drawing. At that moment the lever 16 is retracted, the quadrant 35 rests on the bottom 23 of the cam 20, and the stub shaft 40 is located in the upper end of the slot 38. In order to discharge the load from the platform 3, the operator pulls the upper end of the lever 16 away from the frame 2. The quadrant 35 acts as a fulcrum around which the lever 16 swings. At the same time the lever 16 is so guided by the stub-shaft 40 and the slots 38 that the pusher 17 follows the platform 3. The gradual downward motion of the lever 16 forces the quadrant 35 to rotate in a contra clockwise direction, thus the pivot point for the lever 16 travels upwardly and, hence, the leverage of the lever 16 diminishes.

The lever 16 is swung in a clock-wise direction until the stub-shaft 40 reaches the lower end of the slot 38 at which time the quadrant 35 is rotated substantially 90° and is abutted by the top 21 of the guard 20, thus stopping the further motion of the lever 16. At this moment (as shown in Fig. 4) the pusher 17 is over the end of the platform 3, and the discharge of the load is completed.

The guides 30 are spaced to admit the guard 20 therebetween, thus forcing the lever 16 to move in a plane parallel to said plates and hence the movement of the pusher 17 parallel to the platform 3 is assured.

The frame 2 and the upper end of the lever 16 is preferably provided with some means for retaining the lever 16 in the position shown in Fig. 1. Said means may comprise a small catch 45 welded to the upper portion of the frame 2, and having a round opening 46 into which the bent end 47 of the lever 16 springs and is thus retained therein.

A modified form of my hand truck shown in Figs. 8 to 13 comprises a rigid frame member 50 in form of an inverted U-shape made preferably out of steel tubing, to the lower ends of which is secured a load supporting platform 51. Each leg of the frame member 50 carries an axle bracket 53, to which is secured an axle 54 rotatably carrying two truck wheels 56.

The unloading mechanism includes a lever 60 extending from the top of the member 50 to the platform 51 and terminating with a load pusher 61, extending at the right angle to the lever. The pusher 61 pushes the load off the platform 51 when the lever 60 is swung in a clockwise direction looking at Figs. 8, 9 and 10.

The lever 60 is arranged for swinging and for forward motion so that the load pusher 61 substantially follows the platform 51. The mechanism for said motion consists of two parallel guide plates 63 secured to a cross-piece 64 carried by said frame member 50 and to the axle 54. Said guide plates 63 carry a shaft 65 which serves as a point of fulcrum for the lever 60 at the beginning of its swinging for the purpose of pushing the cargo off the platform 51, as shown in Fig. 9. A bearing 68 is slidably arranged between the guide plates 63. Said bearing consists of two parallel sides 69, between which the lever 60 slides, said sides being rigidly connected by a heavy block 70, through which slidably passes a stub-shaft 72 secured to the lever 60. Each of the sides 69 carries a pin 73 which is slidable in a slot 74 provided in each of the guide plates 63. When the lever 60 is swung in a clockwise direction from its normal position as shown in Fig. 8, it abuts the shaft 65 which is fairly close to the platform 51, thus giving considerable leverage to the lever 60 at the beginning of the pushing operation. Normally the lever 60 is in the front part of the bearing 68, and the latter is in the uppermost position so that the pins 73 are in the upper ends of the slots 74. When the lever 60 is swung in the clock-wise direction, the lever travels toward the block 70 of said bearing, and at the same time the bearing 68 swings and travels with the lever downwardly. When the load is over a half way across the platform 51, the lever leaves the shaft 65 and swings about the pins 73. At the time when the pins 73 reach the lower ends of the slots 74, the pusher 61 reaches the end of the platform 51. At that time the lever 60 is precluded from further forward movement by a stop bracket 76 which hits the shaft 65, as shown in Fig. 10.

I claim:

1. A hand truck comprising an upright frame; a load carrying platform secured to the lower end of said frame; an axle secured to said frame back of said platform; a pair of wheels carried by the ends of said axle; means for pushing the load off said platform, comprising a lever arranged on said frame, a pusher secured to the lower end of said lever for pushing the load off the platform, said pusher extending parallel to said platform in close proximity thereto, a pair of parallel spaced guide plates secured to the frame, a fulcrum for the lever secured to said guide plates, said guide plates having a pair of slots, means sliding in said slots to control the motion of said lever for moving said pusher over said platform substantially parallel thereto said means providing greater leverage to said lever at the beginning of the load pushing operation and diminishing leverage toward the end of same.

2. The combination with a hand truck having an upright frame, a load carrying platform secured to the lower end of said frame, a pair of wheels rotatably secured to said frame; of a pair of parallel vertical guide plates secured to said frame in spaced relation to each other, a lever extending from the platform upwardly and passing between said plates, a pusher secured to the lower end of said lever, a quadrant abutting said lever and rotatably secured between said guide plates, said plates having a pair of slots therein, means carried by said lever and slidable in the slots for directing in cooperation with said quadrant the lower end of said lever and the pusher parallel to the platform and across the same for pushing the load off the latter, and means confined between the guide plates preventing the rotation of said lever about its longitudinal axis.

3. The combination with a hand truck having an upright frame, a load carrying platform secured to the lower end of said frame, a pair of wheels rotatably secured to said frame; of a pair of parallel vertical guide plates secured to said frame in spaced relation to each other, a lever extending from the platform upwardly and passing between said plates, a pusher secured to the lower end of said lever, a lever fulcrum secured to said guide plates, a slidable bearing arranged between said guide plates for slidably retaining the lever therein, said guide plates having a pair of slots therein, means on said bearing slidable in said slots, means on the lever and associated with the bearing for preventing the longitudinal movement of said lever in relation to said bearing, said fulcrum, bearing and slots cooperating in affecting the movement of the lower end of said lever and the pusher over said platform and substantially parallel to the latter.

4. The combination with a hand truck having an upright frame, a load carrying platform secured to the lower end of said frame, a pair of wheels rotatably secured to said frame; of a pair of parallel vertical guide plates secured to said frame in spaced relation to each other, a lever extending from the platform upwardly and passing between said plates, a pusher secured to the lower end of said lever, a lever fulcrum secured to said guide plates; said guide plates having a pair of slots therein; a bearing between said guide plates slidable in said slots, said lever passing through said bearing with freedom of lateral motion, means on said lever and passing through said bearing for preventing longitudinal movement of said lever in relation to said bearing, said slots, bearing and fulcrum cooperating in affecting the movement of the lower end of said lever and pushing over said platform and substantially parallel to the latter.

5. A hand truck comprising an upright frame having two spaced parallel side members, a load carrying platform secured to the lower end of said frame, an axle carried by said frame; a pair of wheels journalled on said axle at its ends; means for pushing a load off the platform comprising a lever having a handle at its top end and a pusher at its lower end, a pair of spaced guide plates secured to the frame between said side members and extending upwardly from the axle, a fulcrum means for said lever secured to said guide plates and extending from one plate to another and used by said lever for pushing the load off the platform, said guide plates having a pair of slots, means slidable in the slots and operatively connected with said lever for guiding the movement of said lever to move said pusher over said platform substantially parallel thereto and away from said frame.

References Cited in the file of this patent

UNITED STATES PATENTS

| | | |
|---|---|---|
| 2,476,202 | Lozon | July 12, 1949 |
| 2,649,219 | Nielsen | Aug. 18, 1953 |
| 2,682,348 | Stumphauzer | June 29, 1954 |